(12) United States Patent
Lee et al.

(10) Patent No.: US 8,670,522 B2
(45) Date of Patent: Mar. 11, 2014

(54) STEREO X-RAY INSPECTION APPARATUS AND METHOD FOR FORMING THREE-DIMENSIONAL IMAGE THROUGH VOLUME RECONSTRUCTION OF IMAGE ACQUIRED FROM THE SAME

(75) Inventors: Nam Ho Lee, Daejeon (KR); Yong Chil Seo, Daejeon (KR); Seung Chan Oh, Daejeon (KR); Seung Wook Lee, Daejeon (KR); Young Gwan Hwang, Seoul (KR); Myung Kook Moon, Daejeon (KR); Soon Yong Park, Daegu (KR)

(73) Assignee: Korea Atomic Energy Research Institute, Daejeon (KR)

( * ) Notice: Subject to any disclaimer, the term of this patent is extended or adjusted under 35 U.S.C. 154(b) by 195 days.

(21) Appl. No.: 13/179,993

(22) Filed: Jul. 11, 2011

(65) Prior Publication Data
US 2012/0014506 A1 Jan. 19, 2012

(30) Foreign Application Priority Data

Jul. 16, 2010 (KR) .................. 10-2010-0069069
Oct. 21, 2010 (KR) .................. 10-2010-0103076

(51) Int. Cl.
*G03C 9/08* (2006.01)
(52) U.S. Cl.
USPC .............................................. 378/41; 378/57

(58) Field of Classification Search
USPC ........................................... 378/57, 41
See application file for complete search history.

(56) References Cited

U.S. PATENT DOCUMENTS

| 2003/0016781 A1* | 1/2003 | Huang ............................. 378/41 |
| 2008/0075232 A1* | 3/2008 | Agrawal et al. ............... 378/198 |
| 2009/0116617 A1* | 5/2009 | Mastronardi et al. ........... 378/87 |

FOREIGN PATENT DOCUMENTS

| JP | 09-33450 | 7/1997 |
| JP | 10-318943 | 12/1998 |
| KR | 10-2007-0101458 | 10/2007 |

* cited by examiner

*Primary Examiner* — Hoon Song
(74) *Attorney, Agent, or Firm* — Kile Park Reed & Houtteman PLLC

(57) ABSTRACT

A stereo x-ray inspection apparatus and a method for forming a three-dimensional image through volume reconstruction of an image acquired from the same are disclosed. The apparatus includes one x-ray generator and two detectors to acquire two images. The x-ray generator and detectors are arranged in the form of a right-angled triangle, to easily achieve mathematical development and analysis. One of the detectors, which does not just oppose the x-ray generator, is movable and rotatable, to acquire images under the condition that only one detector is moved in accordance with the size of an object, and thus to simplify control operation for the apparatus, so that a more accurate image from an object moving at high speed is acquired.

2 Claims, 16 Drawing Sheets

Three-Dimensional Outline (a) Left and Right Stereo X-Ray Images (b) Binary Images of Left and Right Stereo X-Ray Images (c) Three-Dimensional Outline Image (d) Results of Reconstruction of
Three-Dimensional Volumes at Different View Points (a) Left and Right Stereo X-Ray Images (b) Binary Images of Left and Right Stereo X-Ray Images (c) Three-Dimensional Outline Image (d) Results of Reconstruction of
Three-Dimensional Volumes at Different View Points

US 8,670,522 B2

STEREO X-RAY INSPECTION APPARATUS AND METHOD FOR FORMING THREE-DIMENSIONAL IMAGE THROUGH VOLUME RECONSTRUCTION OF IMAGE ACQUIRED FROM THE SAME

BACKGROUND OF THE INVENTION

1. Field of the Invention

The present invention relates to a stereo x-ray inspection apparatus and a method for forming a three-dimensional image through volume reconstruction of an image acquired from the same, and more particularly to a stereo x-ray inspection apparatus which includes one x-ray generator and two detectors to acquire two images and in which the x-ray generator and two detectors are arranged in the form of a right-angled triangle, to easily achieve mathematical development and analysis, one of the two detectors, which does not just oppose the x-ray generator, is movable and rotatable, in order to acquire images under the condition that only one detector is moved in accordance with the size of an object to be inspected, and thus to simplify control operation for the apparatus, so that it is possible to provide an apparatus capable of acquiring a more accurate image from an object moving at high speed, and a method for forming a three-dimensional image through volume reconstruction of an image acquired from the stereo x-ray inspection apparatus, which is capable of forming an image associated with not only the outline of the object, but also a hidden portion of the object.

2. Description of the Related Art

X-rays are widely used not only in the field of medicine, but also in various fields such as national defense, novel material, agricultural, environmental, and food. Recently, x-rays have been applied to x-ray image inspection, cancer treatment, analysis of isotopes, inspection of imported and exported agricultural and marine products, production of synthetic polymers, treatment of waste such as non-biodegradable wastewater, etc. In this regard, the application range of x-rays is being widened.

Mainly, x-rays are widely used in nondestructive inspection. As a representative apparatus using x-rays, there is an x-ray inspection machine installed at immigration control offices in airports.

The x-ray inspection machine is an apparatus for inspecting an object moved by a feeding device. Conventionally, such an x-ray inspection machine includes a single x-ray generator and a detector. Due to such a configuration, it is difficult for the x-ray inspection machine to accurately check the shape of an object because only a two-dimensional image is acquired by the machine. Of course, a three-dimensional nondestructive image such as a computed tomography (CT) image or a magnetic resonance image (MRI) may be acquired. Although such an image is usable for medical purposes or the like, which do not require high-speed inspection, it cannot be used in physical distribution systems requiring high-speed inspection for continuously-moving large-scale objects because there is a limitation on inspection speed. To this end, research should be conducted into apparatuses capable of solving the above-mentioned problem.

Meanwhile, a three-dimensional image is acquired by combining images acquired by two cameras having different view points, namely, stereo images.

The positions of images respectively acquired by projecting left and right images of an object to be inspected are different from each other. This difference is referred to as "disparity". Generally, the disparity is determined taking into consideration only an x-direction difference. This is because there is only a horizontal disparity in that, typically, stereo cameras are installed to be horizontally arranged.

In order to derive a disparity image, disparities of all pixels with respect to one of left and right stereo images are derived, and an image is formed based on the derived disparities. In order to acquire such a disparity image, it is necessary to derive disparities of the associated image at all positions. The method for acquiring a disparity image is referred to as "stereo matching".

The most general stereo matching technology is a method for comparing particular regions of two images with each other to find identity of the images. This method is referred to as "template matching". Using such a template matching method, disparity of stereo images is estimated. Based on the estimated disparity, the stereo images are estimated.

Template matching is carried out as follows.

The following description will be given in conjunction with, for example, a red square region in a left image shown in FIG. 1. It is assumed that the template in the left image of FIG. 1 is referred to as "$W_L$", and the template in the right image of FIG. 1 is referred to as "$W_R$", and both the positions of the two templates $W_L$ and $W_R$ are located on a y axis. This means that the left and light cameras of a stereo camera unit are located to be movable only in a horizontal direction. Let's assume that the coordinates of a central pixel of the template $W_L$ are "$x_L$, $y_L$", and the coordinates of a central pixel of the template WR are "$x_L$–d, $y_L$". In this case, "d" represents the disparity between the left and right images. When the disparity d is not zero, this means that an object to be inspected is located at different positions on a horizontal axis in the two images. This is referred to as a "disparity of stereo images".

In order to derive a disparity of stereo images, the coordinates of the template region $W_m(x, y)$ are derived while varying the disparity d along a horizontal line within a possible range for all pixels of the right image, as follows:

$$W_m(x, y) = \left\{ u, v \mid x - \frac{m}{2} \leq u \leq x + \frac{m}{2}, Y - \frac{m}{2} \leq v \leq y + \frac{m}{2} \right\}$$

The template regions $W_m(x, y)$ in the left and right images are compared with each other, as expressed by the following expression. In the following expression, "$I_L$" and "$I_R$" represent brightness values of the left and right images, respectively. Referring to the following expression, the difference between the brightness values of two pixels is squared, and this squaring operation is repeated for all pixels. The results of the squaring operations repeated for all pixels are then summed. The resultant value is referred to as a "cost value $C_r(x, y, d)$" of the templates $W_L$ and $W_R$. The procedure for finding the disparity d, which corresponds to a minimum value of the derived cost values $C_r(x, y, d)$, is a procedure for estimating the disparity of stereo images.

$$C_r(x, y, d) = \sum_{(u,v) \in W_m(x,y)} [I_L(u, v) - I_R(u - d, v)]^2$$

However, the above procedure is used to acquire stereo images through a general camera, as shown in FIG. 2(a). This procedure cannot be used to acquire an x-ray image as shown in FIG. 2(b).

Furthermore, even when an x-ray image is acquired, three-dimensional reconstruction of an outline is possible only for an outline aligned with the orientation of the object and the line extending between an x-ray source and a sensor. Furthermore, only the outline of an outer surface of the object is mainly reconstructed, and the outline of an inner surface of the object is hardly indicated in an acquired image. Thus, it is insufficient to reconstruct the entire outline.

SUMMARY OF THE INVENTION

The present invention has been made in view of the above mentioned problems, and an object of the invention is to provide a stereo x-ray inspection apparatus in which one x-ray generator and two detectors arranged in the form of a right-angled triangle, to acquire two images, and the acquisition of such image information is achieved by moving and rotating only one of the two detectors in accordance with the size of an object to be inspected while maintaining the right-angled triangular arrangement of the x-ray generator and detectors, to easily achieve mathematical development and analysis, and thus to simplify control operation for the apparatus, so that it is possible to acquire a more accurate image from an object moving at high speed.

Another object of the present invention is to provide a method for forming a three-dimensional image through volume reconstruction of an image acquired from the stereo x-ray inspection apparatus, which is capable of not only achieving three-dimensional reconstruction of an outline of an object to be inspected, based on two images acquired through a stereo x-ray inspection apparatus, but also achieving volume reconstruction to reconstruct the entire shape of the object.

In accordance with one aspect of the present invention, a stereo x-ray inspection apparatus includes a feeding unit for feeding an object to be inspected, an x-ray generator installed at one side of the feeding unit to irradiate x-rays to the object, and first and second detectors for detecting x-rays passing through the object after being irradiated from the x-ray generator to the object.

In accordance with another aspect of the present invention, a method for forming a three-dimensional image based on stereo images acquired in an x-ray inspection apparatus including an x-ray generator for generating x-rays to pass through an object to be inspected, two x-ray detectors for detecting x-ray images obtained as the x-rays pass through the object after being irradiated to the object comprises photographing an edge of the object using the x-ray generator and the x-ray detectors, which are in a fixed state and a horizontally moved state, respectively, thereby acquiring line-scanned two-dimensional images, as x-ray images, deriving a disparity between edge regions of the two x-ray images, which are stereo images acquired by the inspection apparatus, and acquiring a three-dimensional edge image through template matching for transforming the derived disparity into three-dimensional information, creating an estimated volume constituted by a number of voxels in a three-dimensional space to be reconstructed, and removing, from the estimated volume, pixels of a ground other than a region occupied by the object, based on the three-dimensional edge image of the object acquired through the template matching, thereby forming a three-dimensional image through volume reconstruction.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, a stereo x-ray inspection apparatus according to an embodiment of the present invention will be described with reference to the accompanying drawings.

Figure 1:
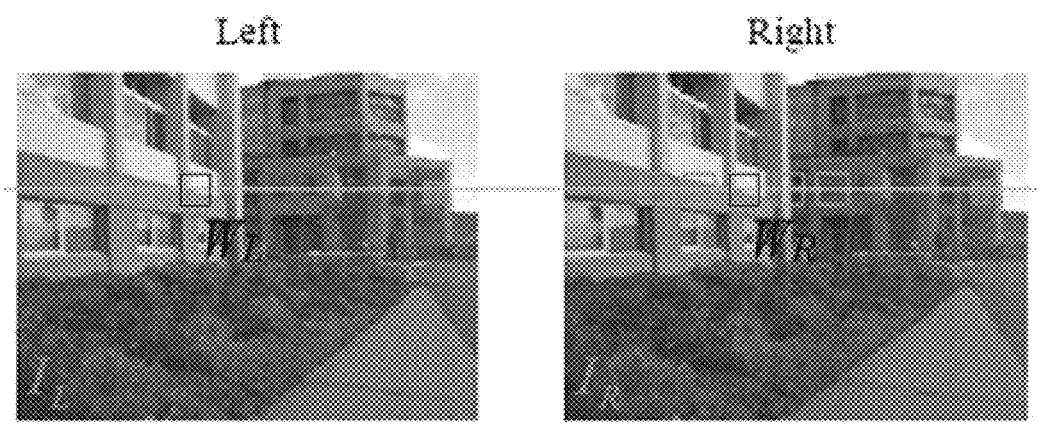
FIG. 1 illustrates photographs indicating comparative template regions of left and right images photographed by general cameras.
Figure 2:
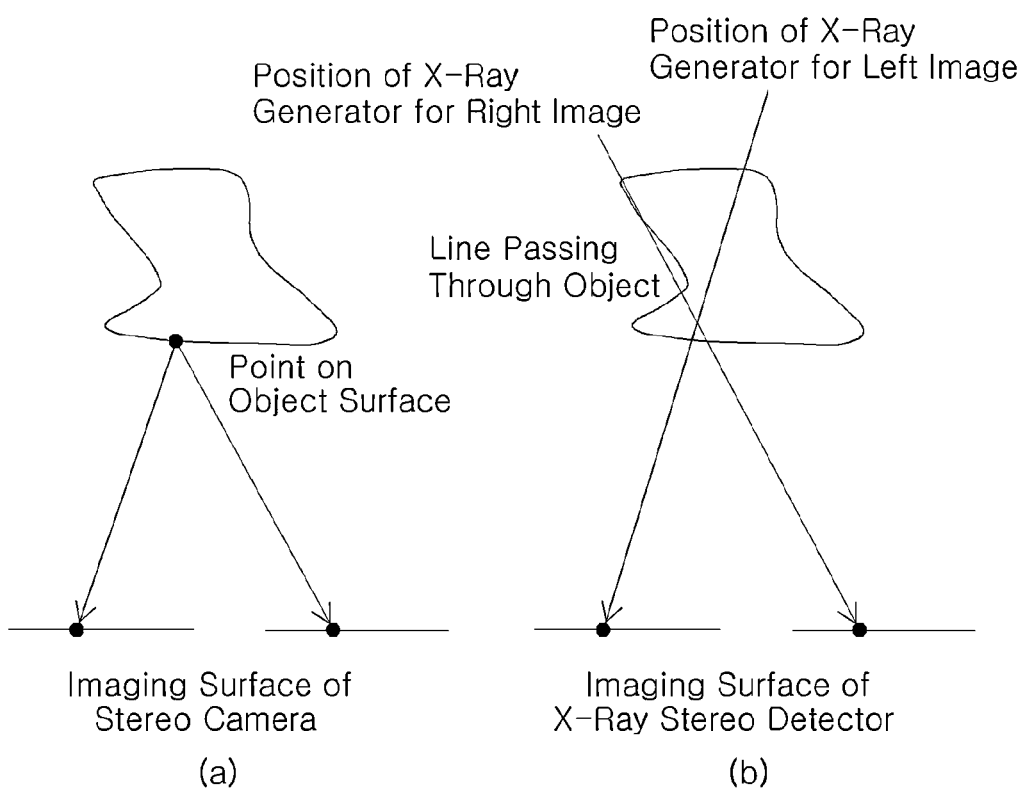
FIG. 2 is a schematic view illustrating principles of stereo image creation using general cameras and x-ray sensors.
Figure 3:
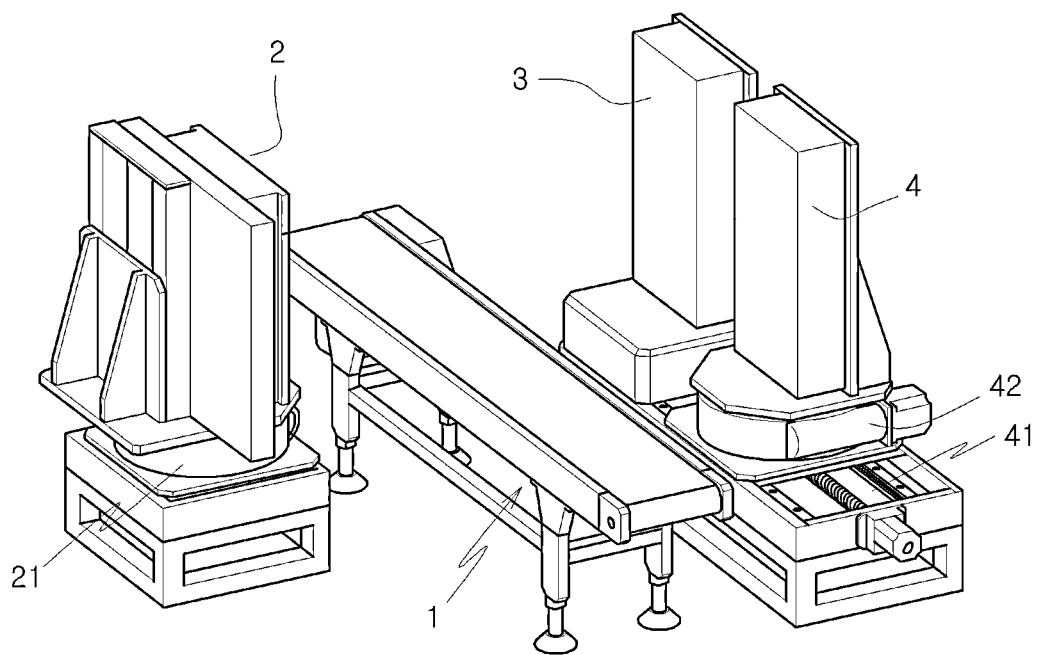
FIG. 3 is a perspective view illustrating an example of a stereo x-ray inspection apparatus according to an embodiment of the present invention.
Figure 4:
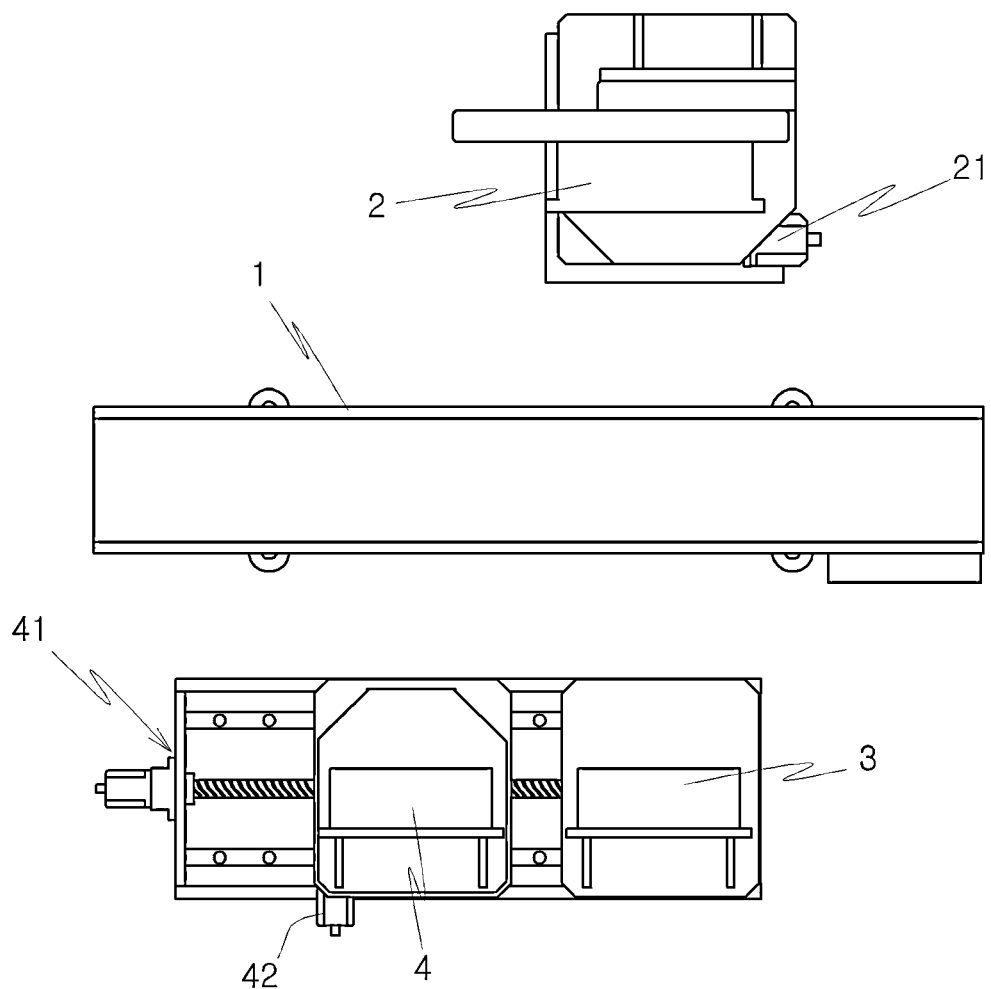
FIG. 4 is a plan view of the stereo x-ray inspection apparatus shown in FIG. 3.
Figure 5:
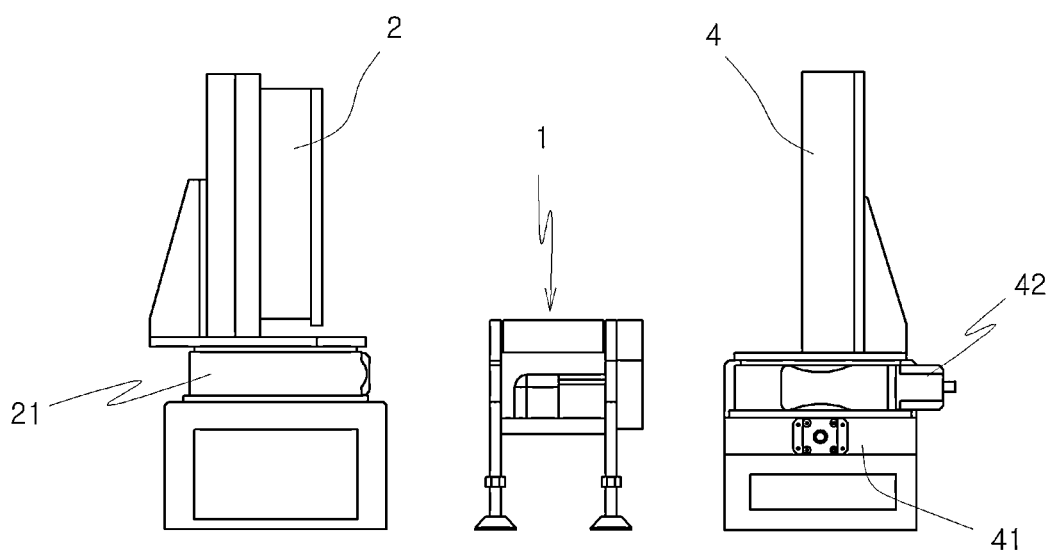
FIG. 5 is a side view of the stereo x-ray inspection apparatus shown in FIG. 3.

As shown in FIGS. 3 to 5, the stereo x-ray inspection apparatus according to an embodiment of the present invention can easily inspect an object by detecting two-dimensional images of the object at different angles, forming a stereo image from the detected images, and then rapidly acquiring a more accurate image of the object.

The stereo x-ray inspection apparatus according to the illustrated embodiment of the present invention includes a feeding unit 1 for feeding an object to be inspected, an x-ray generator 2 installed at one side of the feeding unit 1 to irradiate x-rays to the object, and two detectors, namely, first and second detectors 3 and 4, for detecting x-rays passing through the object after being irradiated from the x-ray generator 2 to the object.

For the feeding unit 1, a conveyor used to feed an article or various devices capable of horizontally moving an object to be inspected may be typically used.

The x-ray generator 2 and the first and second detectors 3 and 4 have structures and functions identical or similar to those of a conventional x-ray generator and detectors installed at immigration control offices. The x-ray generator 2 irradiates an x-ray toward the first and second detectors 3 and 4. The first and second detectors 3 and 4 detect the x-ray incident thereon after passing through an object to be inspected.

A tube voltage of 40 to 120 kV may be applied to the x-ray generator 2. The current applied to the x-ray generator 2 is adjustable within a range of 250 to 7,500 µA. A reference position, at which an x-ray is generated, is inwardly spaced apart from a front surface of the x-ray generator 2 by 81.75 mm and from a bottom surface of the x-ray generator 2 by 101.6 mm while being spaced apart from a left corner of the x-ray generator 2 by 367.05 mm.

An aluminum member having a thickness of 0.4 m is disposed at a region where an x-ray is emitted, to provide a filter function. The emission angle of x-ray beams is designed to be 80° in the vertical direction while being a maximum of 10° in the horizontal direction. The energy set and used in this test is 129 keV.

Figure 6:
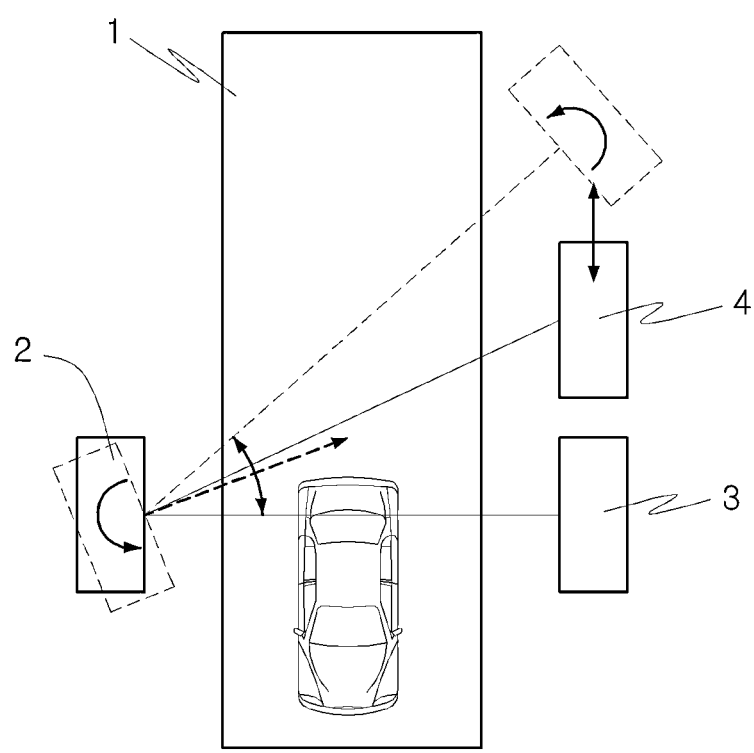
FIG. 6 is a plan view for explaining an inspection method using the apparatus shown in FIGS. 3 to 5.

As shown in FIG. 6, x-rays emitted from the x-ray generator 2 are irradiated toward the first and second detectors 3 and 4. The x-rays irradiated from the x-ray generator 2 to the first and second detectors 3 and 4 pass through an object to be inspected, and are then incident on the first and second detectors 3 and 4, each of which detect the incident x-rays in the form of a two-dimensional image. The two-dimensional images detected by the first and second detectors 3 and 4 correspond to images obtained when the object to be inspected is viewed at different angles, respectively.

As the two-dimensional images obtained from the first and second detectors 3 and 4 are combined, it may be possible to acquire stereo images of the object to be inspected. Thus, a more accurate image of the object to be inspected can be acquired.

Thus, an x-ray image irradiated from one x-ray generator 2 is incident on the first and second detectors 3 and 4. In order to acquire more accurate stereo images of the object based on the incident x-ray image, it is necessary to adjust the distance between the first and second detectors 3 and 4 and the orientation of the x-ray generator 2 in accordance with the size of the object.

To this end, one of the first and second detectors 3 and 4, for example, the second detector 4, is installed to be horizontally movable by a horizontal feeding unit 41. The second detector 4 is also installed to be rotatable by a rotating unit 42.

As the second detector 4 is horizontally movable, it may be possible to adjust the distance between the first detector 3 and the second detector 4. Since the second detector 4 is also rotatable, it can be adjusted to be directed to the x-ray generator 2 such that the irradiated x-ray is incident on the second detector 4 as well as the first detector 3.

In this case, the second detector 4 is preferably automatically rotated in accordance with the movement distance of the second detector 4 so as to always be directed toward the x-ray generator 2. For example, the movement distance of the horizontal feeding unit 41 for the second detector 4 is measured by a sensor. The measured value is compared with a reference value, to calculate a rotating angle. Then, the second detector 4 is rotated by the calculated rotating angle. Where the horizontal feeding unit 41 is a linear motion (LM) guide, it may be possible to set the rotating angle of the second detector 4 in accordance with the number of revolutions of a shaft. Thus, the rotating unit 42 for the second detector 4 may be operatively connected to the horizontal feeding unit 41 through various methods so that the second detector 4 is rotated in accordance with the movement distance of the second detector 4.

When the second detector 4 is moved beyond an irradiation range of the x-ray generator 2, it may be possible to achieve x-ray irradiation onto the second detector 4 by rotating the x-ray generator 2. That is, the x-ray irradiated from the x-ray generator 2 should be incident on both the first detector 3 and the second detector 4. Therefore, the x-ray generator 2 should be installed to vary the orientation thereof. To this end, a rotating unit 21 is mounted to the x-ray generator 2 in order to rotate the x-ray generator 2, and thus to adjust the x-ray irradiation direction of the x-ray generator 2.

For example, when the second detector 4 is positioned outside the irradiation range or angle of the x-ray generator 2, the x-ray generator 2 is rotated as shown in FIG. 6. In this case, the x-ray generator 2 is preferably rotated to be directed to a center line bisecting an angle defined between the first detector 3 and the second detector 4. As the x-ray generator 2, which has a fixed irradiation angle, is directed to the center line bisecting the angle between the first detector 3 and the second detector 4, it is possible to space the first and second detectors 3 and 4 apart from each other by a maximum distance within a range corresponding to the irradiation angle.

When the distance between the first and second detectors 3 and 4 is excessive, it may be impossible to irradiate the x-rays emitted from the x-ray generator 2 to both the first detector 3 and the second detector 4 only by varying the orientation of the x-ray generator 2. This is solved by providing a configuration for horizontally moving the x-ray generator 2.

Meanwhile, in accordance with an exemplary embodiment of the present invention, the x-ray generator 2 and the first detector 3 are disposed to be opposite to each other along a perpendicular line extending between the x-ray generator 2 and the first detector 3. The second detector 4 is disposed on the same horizontal line as the first detector 3. The horizontal line is perpendicular to the perpendicular line. Thus, the x-ray generator 2, first detector 3 and second detector 4 are arranged to form a right-angled triangular shape.

That is, when the stereo x-ray inspection apparatus is configured such that the x-ray generator 2 and first detector 3 are fixed on a perpendicular line extending therebetween, and the second detector 4 is movable along a horizontal line perpendicular to the perpendicular line under the condition that the first and second detectors 3 and 4 are arranged on the horizontal line, as in the illustrated embodiment of the present invention, it may be possible to simplify mathematical development and analysis algorithms for image transformation because the line defined between the x-ray generator 2 and the first detector 3 and the line defined between the first detector 3 and the second detector 4 are always perpendicular to each other, namely, always form right angles. In this case, accordingly, it may be possible to rapidly acquire a desired image.

For example, in accordance with an exemplary embodiment of the present invention, an x-ray irradiated from a single x-ray generator is incident on two detectors, namely, first and second detectors, at different angles after passing through an object to be inspected, so that two two-dimensional images are acquired. The two-dimensional images are then combined. Thus, a stereo image is acquired. The two two-dimensional images acquired through the above-described procedure are combined using known mathematical development and analysis algorithms to provide a stereo image.

One parameter in the above-described procedure is the angle defined among the x-ray generator and two detectors. In the above calculation procedure, the two two-dimensional images acquired by the two detectors are combined, taking into consideration the angle defined by the x-ray generator and first detector and the angle defined by the x-ray generator and second detector. In this case, it may be possible to more rapidly achieve the above calculation procedure by simply fixing the angle defined by the x-ray generator and first detector, and thus to enhance the accuracy of a finally acquired stereo image.

The device for transforming two two-dimensional images into a stereo image through mathematical development and analysis algorithms is installed in a controller such as a computer device equipped with an image editor and is well known. As such, no detailed description of this device will be given.

Hereinafter, a procedure for inspecting an object using the stereo x-ray inspection apparatus having the above-described configuration according to the illustrated embodiment of the present invention will be described in brief.

Figure 7:
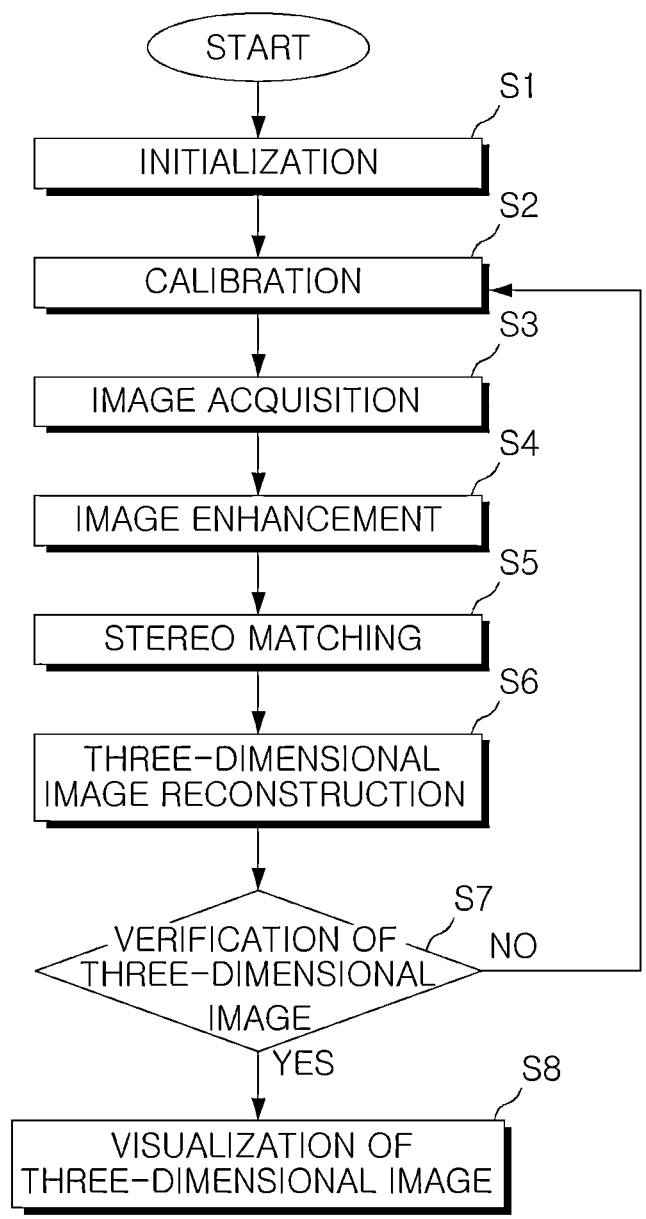
FIG. 7 is a flowchart for explaining an inspection procedure carried out using the stereo x-ray inspection apparatus according to the illustrated embodiment of the present invention.

FIG. 7 is a flowchart illustrating the inspection procedure.

Parameters associated with the x-ray generator, detectors, and feeding unit are set in an initialization process S1 for use of the apparatus, prior to inspection of an object. In order to acquire a distinct image, it is necessary to set an optimal tube voltage and an optimal tube current value for the x-ray generator, which meet the characteristics of the object. It is also necessary to synchronize the scan speeds of the detectors and the feeding speed of the feeding unit in order to acquire an accurate stereo image.

A calibration process S2 follows the initialization process S1. The calibration process S2 is a process for obtaining matrix information about correlation between three-dimensional spatial coordinates such as relative positions and spacings of inspection devices and two-dimensional x-ray image coordinates of two images acquired after scanning.

An image acquisition process S3 follows the calibration process S2. In the image acquisition process S3, stereo images, namely, left and right images, are acquired through x-ray scanning of the object using the prepared apparatus and implemented program. In detail, the image acquisition process S3 is a process for acquiring one two-dimensional image from one of the detectors, namely, a reference detector, located on the same optical axis as the x-ray generator, that is, a first frame, and another two-dimensional image acquired from the remaining detector having a predetermined disparity angle from the reference detector, namely, a second frame.

The acquired two images are subjected to an image enhancement process S4 involving image pre-processing and feature point extraction, and then subjected to a stereo matching process S5.

The stereo matching process S5 needs a more complex algorithm than a general visible-ray stereo matching process. This is because the stereo matching based on x-ray scan information determines information of the object only based on density information obtained in accordance with transmission of x-rays through the object, different than the general stereo matching using information of light reflected from the surface of the object.

The three-dimensional information of the object acquired through the stereo matching is subjected to a reconstruction process S6 for initial three-dimensional object information, and is then subjected to a three-dimensional image visualization process S8 using various tools, in order to enable the viewer to view the results of the final three-dimensional information.

Of course, the image reconstructed in the reconstruction process S6 for the three-dimensional object information is verified through a verification process S7, prior to the image visualization process S8. When the image is verified as being normal, it is subjected to the image visualization process S8. On the other hand, when the image is verified as being abnormal, the procedure is returned to the calibration process S2, and the processes following the calibration process S2 are repeated.

Hereinafter, a method for forming a three-dimensional image based on stereo images acquired in the stereo x-ray inspection apparatus will be described.

In accordance with an exemplary embodiment of the present invention, there is provided a method for forming a three-dimensional image based on stereo images acquired in the x-ray inspection apparatus, which includes the x-ray generator 2 for generating x-rays to pass through an object to be inspected, the two x-ray detectors 3 and 4 for detecting x-ray images obtained as the x-rays pass through the object after being irradiated to the object, the method including photographing an edge of the object using the x-ray generator 2 and the x-ray detectors 3 and 4, which are in a fixed state and a horizontally moved state, respectively, thereby acquiring line-scanned two-dimensional images, as x-ray images, deriving a disparity between edge regions of the two x-ray images, which are stereo images acquired by the inspection apparatus, acquiring a three-dimensional edge image through template matching for transforming the derived disparity into three-dimensional information, creating an estimated volume constituted by a number of voxels in a three-dimensional space to be reconstructed, and removing, from the estimated volume, pixels of the ground other than a region occupied by the object, based on the three-dimensional edge image of the object acquired through the template matching, thereby forming a three-dimensional image.

That is, the illustrated embodiment of the present invention has a feature in that a volume image is reconstructed from a three-dimensional x-ray image through the three-dimensional image forming method.

The x-ray generator 2 is a means for irradiating an x-ray to pass through the object. The irradiated x-ray is detected by the x-ray detectors 3 and 4 after passing through the object.

The x-ray generator 2 may rotate in accordance with the size of the object, in order to vary the x-ray irradiation direction or region.

As shown in FIG. 6, the x-ray detectors 3 and 4 are arranged to be directed to the x-ray generator 2. One of the two x-ray detectors 3 and 4 is adjustable in position in accordance with the size or length of the object. The image detected by each of the x-ray detectors 3 and 4 is an edge image of the object.

The illustrated embodiment of the present invention has a feature in terms of template matching for estimating a stereo image based on x-ray images photographed by the x-ray generator 2 and x-ray detectors 3 and 4.

As described above, it is impossible to extract an x-ray stereo image using a matching method for extracting a stereo image based on two images photographed by a conventional general camera. In the illustrated embodiment of the present invention, however, estimation of a three-dimensional image is achieved using template matching.

The template matching process for the x-ray three-dimensional image is carried out as follows.

Since each of the x-ray detectors 3 and 4 is a one-dimensional x-ray detector, it is necessary to horizontally move one of the x-ray detectors 3 and 4 with respect to the other of the x-ray detectors 3 and 4 or to move an object to be inspected, in order to acquire a two-dimensional x-ray image of the object.

It may be possible to acquire a two-dimensional image of an object by acquiring x-ray information of different lines on the object for a certain period of time, and combining the acquired images. The resultant image is referred to as a "line-scanned two-dimensional image" or a "pushbroom image".

Pushbroom scheme is a scheme mainly used for acquisition of satellite images. In accordance with this scheme, a satellite acquires one-dimensional images while orbiting around the earth, and the acquired images are combined to acquire two-dimensional image information.

Figure 8:
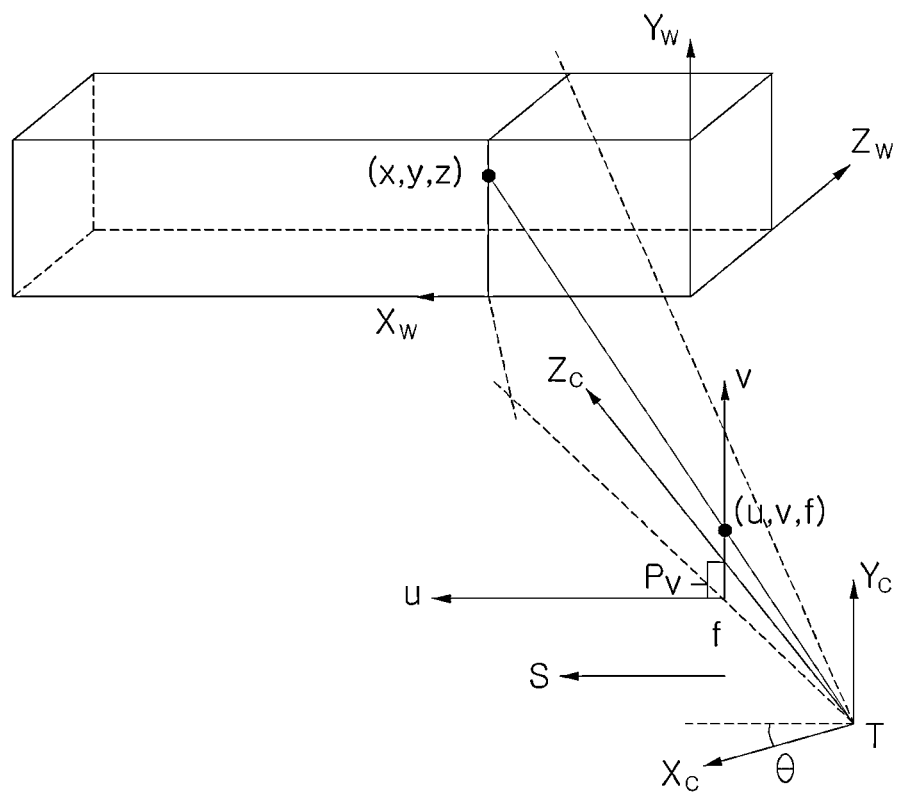
FIG. 8 is a schematic view illustrating a coordinate system of a stereo x-ray image forming apparatus for extraction of a calculation expression for calculating a three-dimensional image associated with an edge.

FIG. 8 illustrates a coordinate system of a stereo x-ray image forming apparatus according to a pushbroom scheme. The space, in which an object to be inspected moves, is represented by a reference coordinate system $(X_w, Y_w, Z_w)$.

In FIG. 8, "$(X_c, Y_c, Z_c)$" represents the coordinate system of each of the x-ray detectors 3 and 4, "(u, v, f)" represents a coordination system of an x-ray image, "f" represents a focal distance of each x-ray detector, and "S" represents a movement speed of the object.

Where the coordinate system of the x-ray image is set as shown in FIG. 8, the procedure for projecting the three-dimensional coordinates (x, y, z) on left and right stereo image points $u_k$ and $v_k$ corresponds to transformation relation of a pushbroom camera. The left or right stereo image point $(u_k, v_k)$ may be expressed by the following expressions:

$$u_k = \frac{x - T_{xk} - (z - T_{zk})\tan\theta_k}{S_k}$$

$$v_k = f_k \cos\theta_k \frac{y - T_{yk}}{z - T_{zk}} + P_{vk}$$

where, "k" is 1 or 2.

When "k" is 1, the stereo image point is associated with the left detector. On the other hand, when "k" is 2, the stereo image point is associated with the right detector.

"$T_k$" ($T_k=(T_{xk}, T_{yk}, T_{zk})$) represents translation transformation from a world coordinate system, which is the reference coordinate system, to the detector coordinate system. "$\theta_k$" represents a rotation angle of the left or right detector. The rotation angle represents a relative rotation to a y-axis of the world coordinate system.

"$p_v$" represents a center coordinate of each detector with respect to the y-axis. "$S_k$" represents a speed at which the object moves in an x-axis direction.

Certain constants in the above expressions should be previously known. In the case in which the x-ray generator and detectors are fixed, "$T_k$" ($T_k=(T_{xk}, T_{yk}, T_{zk})$) and "$\theta_k$" are always constant. In this case, accordingly, these values should be previously calibrated. FIG. 8 shows, on an X-Z plane of the world coordinate system, the configuration of the stereo x-ray image forming apparatus to calibrate the two constants.

Figure 9:
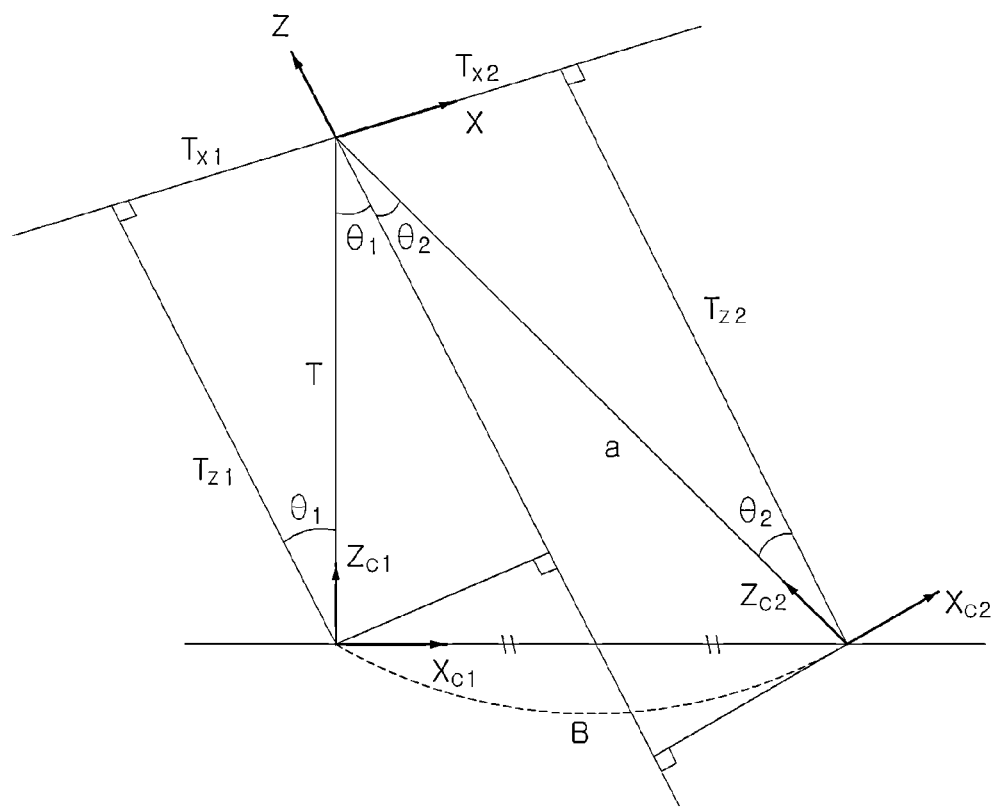
FIG. 9 is a schematic view illustrating x-z coordinates of a world coordinate system for a configuration of the stereo x-ray image forming apparatus according to the illustrated embodiment of the present invention.

The distance T between the x-ray generator 2 and the left detector as shown in FIG. 9 is fixed to 1096.8 mm. The distance B between the two detectors is fixed to 150 mm. In order to derive a translation transformation vector between the x-ray generator and each detector, the following expressions are used.

$$T_{x1} = -T\sin(\theta_1)$$

$$T_{z1} = -T\cos(\theta_1)$$

$$T_{x2} = a\sin(\theta_2)$$

$$T_{z2} = -a\cos(\theta_2)$$

where, "a" represents the distance between the x-ray generator and the right detector.

The distance a may be derived using the following expression:

$$a = \sqrt{T^2 + B^2}$$

In the apparatus according to the illustrated embodiment of the present invention, the coordinate systems of the two detectors are rotated by $\theta_1$ and $\theta_2$, respectively. In order to create a stereo image using image detectors according to the pushbroom scheme, the rotation angles of the two detectors should be different. If not, identical images are created even though the left and right detectors acquire two images, respectively. In this case, it is impossible to derive a disparity between the images.

When the disparity between the left and right x-ray stereo images is derived in accordance with the above-described template matching scheme, it is necessary to transform the derived disparity into three-dimensional information. This transformation is referred to as "three-dimensional matching".

The procedure for transforming a disparity into three-dimensional information may be arranged using the following three expressions:

First, it is assumed that a point P in the object is represented by "(x, y, z)", and a stereo disparity d for this point P is represented by "$(u_2-u_1)$". In this case, the z-axis coordinate is expressed by the following expression:

$$z = \frac{s(u_2 - u_1) - (T_{x1} - T_{z1}\tan\theta_1) + (T_{x2} - T_{z2}\tan\theta)}{\tan\theta_1 - \tan\theta_2}$$

The x and y-axis coordinates may be expressed by the following expressions:

$$x = u_1 S + T_{x1} + z\tan\theta_1 - T_{z1}\tan\theta_1$$

$$y = \frac{(v_1 - p_{v1})(z - T_{z1})}{f_1 \cos\theta_1}$$

Figure 10:
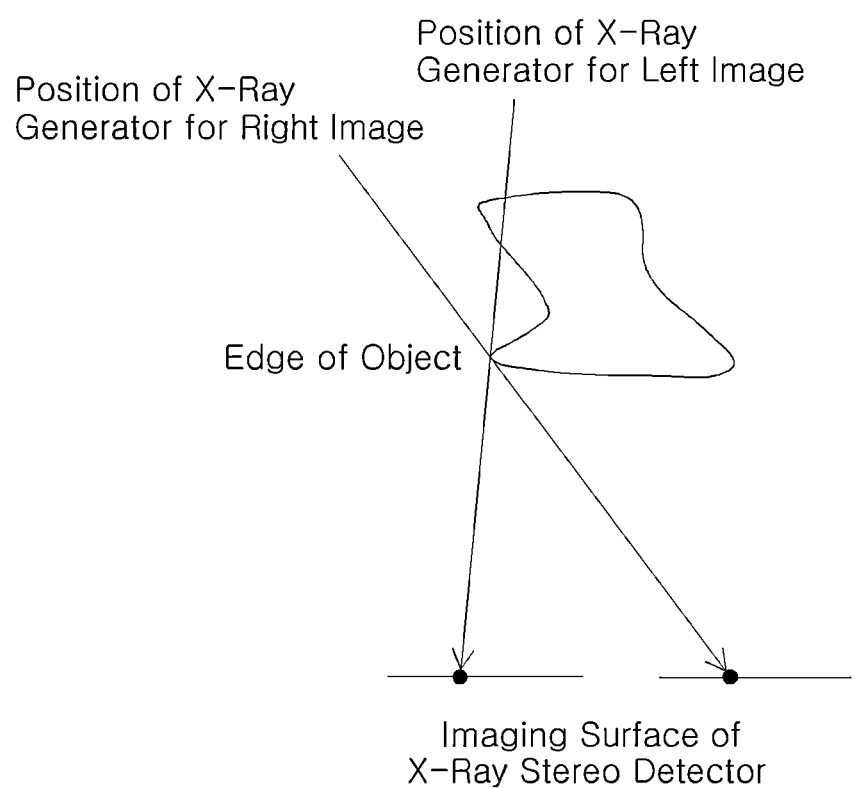
FIG. 10 is a schematic view for explaining a principle of stereo x-ray image creation for an edge of an object according to an embodiment of the present invention.

As shown in FIGS. 6 and 10, x-rays are irradiated from the x-ray generator 2 in the test according to the illustrated embodiment while linearly moving the object under the condition that the object is laid on a linear stage. The x-ray detectors 3 and 4 then detect images of the irradiated x-rays, which pass through an edge region of the object, respectively, to acquire a stereo x-ray image.

In this case, the feeding speed for the object is set to 2 mm/sec.

An edge image is derived from the right image. Then, a point $(u_1, v_1)$ on a left image, which corresponds to each pixel $(u_2, v_2)$ in the edge image, is derived. For matching, template matching is used. Also, a matching error is derived using a normalized cross correlation (NCC) analyzer, which is generally mainly used.

When "$W_1$" and "$W_2$" represent templates of left and right x-ray images, respectively, the matching error NCC may be derived as follows:

$$\rho(W_1, W_2) = \frac{\text{Cov}(W_1, W_2)}{\sqrt{\text{Var}(W_1)\text{Var}(W_2)}}$$

The size of each template is set to 25 pixels. Since there is no disparity between x-ray images along the y-axis, the template of the left x-ray image is compared in the x-axis direction for all pixels, to find a position where a maximum matching error NCC is generated. This position is then determined as a matching position.

Figure 11:
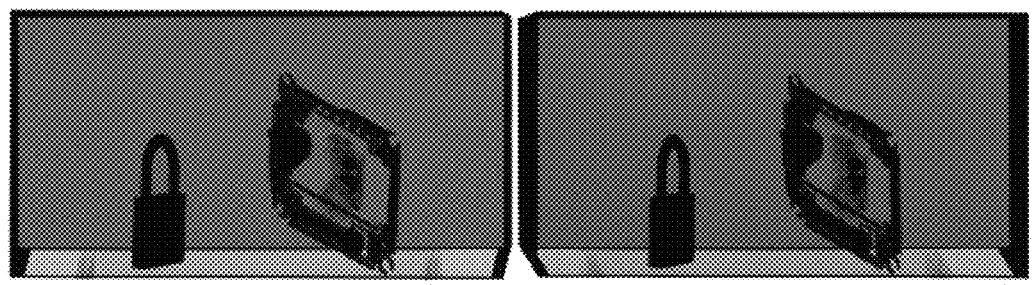
FIG. 11 is a view illustrating left and right x-ray images.
Figure 12:
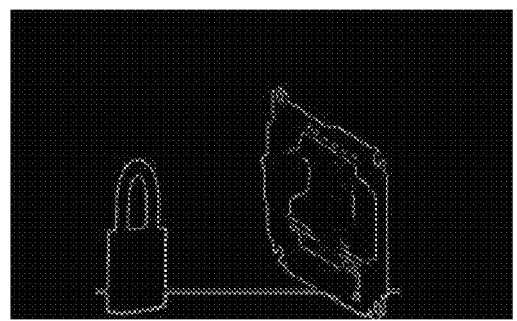
FIG. 12 is a view illustrating a right x-ray edge image.
Figure 13:
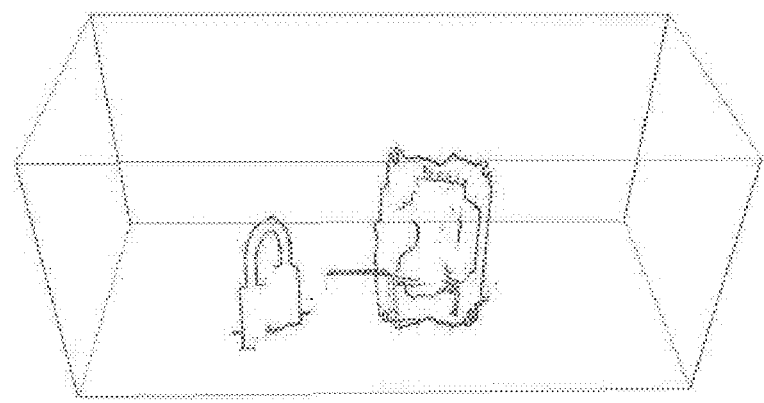
FIG. 13 is a view illustrating an image acquired after three-dimensional reconstruction.

FIG. 11 shows the left and light x-ray images of the object. FIG. 12 shows a result obtained after subjecting the right x-ray image to Sobel processing. As shown in FIGS. 11 and 12, when an x-ray passes through a metal material, a dark image is acquired. Although the input image actually has an edge region at a peripheral region around the image due to a metal case, only an edge image of the object is derived. FIG. 13 shows an object image reconstructed in accordance with three-dimensional reconstruction.

Since only the edge region is reconstructed in accordance with three-dimensional reconstruction, the entire shape of the object cannot be identified. However, it may be possible to obtain a sufficient result to identify an outline of the object.

In accordance with the three-dimensional edge image reconstructed as described above, only the outline aligned with the orientation of the object and the line extending between the x-ray generator and each detector can be reconstructed. Furthermore, only the outline of an outer surface of the object is mainly reconstructed, and the outline of an inner surface of the object is hardly indicated in the image. Thus, it is insufficient to reconstruct the entire outline.

To this end, in accordance with an embodiment of the present invention, formation of a three-dimensional image based on volume reconstruction is achieved.

In the three-dimensional image formation method, a volume constituted by a number of voxels is created in a three-dimensional space to be reconstructed. The size of the volume is represented by the number of voxels. The width, height, and depth of the volume are represented by "W", "H", and "D", respectively. Generally, an initial volume "W×D×H" is constituted by "n×n×n" voxels. When the number of voxels increases, the accuracy of the final reconstruction of the volume increases. The size of the initial voxel space is defined as follows:

$W=(X_{max}-X_{min})/v_x$ $H=(Y_{max}-Y_{min})v_y$ $D=(Z_{max}-Z_{min})v_z$ where, "$v_x$", "$v_y$", and "$v_z$" represent the sizes of one voxel in x, y, z-axis directions, respectively, and the minimum and maximum values in each axis direction use minimum and maximum values for three-dimensional outline reconstruction.

Figure 14:
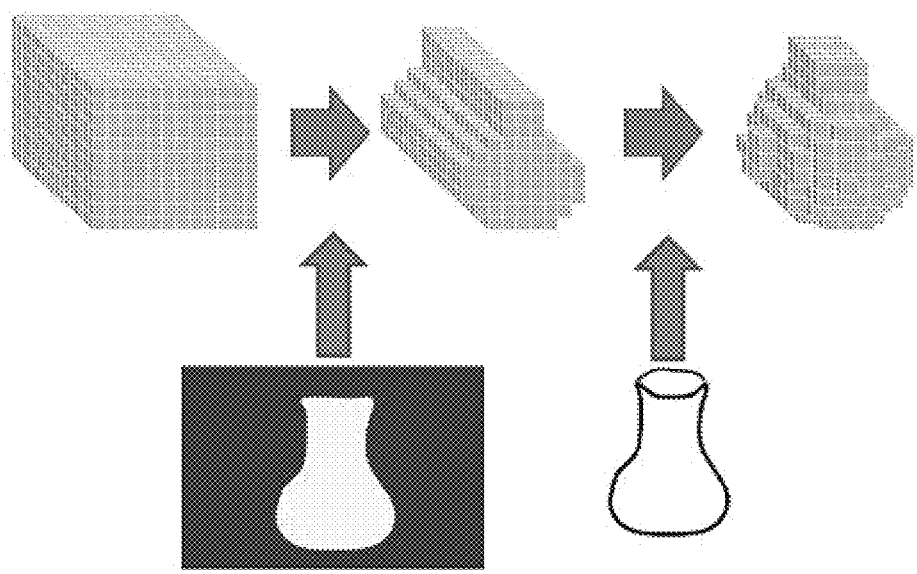
FIG. 14 is a flowchart illustrating a volume reconstruction procedure.

As shown in FIG. 14, the initial volume occupies a cube space. First, the region of the object is separated from the stereo image in the space. Separation of the object region may be achieved using a simple image separation algorithm because the ground and object in an x-ray image exhibit a great brightness difference. Thereafter, voxels corresponding to the ground are removed from the initial volume, using a binary image obtained after the object region is separated.

Figure 15:
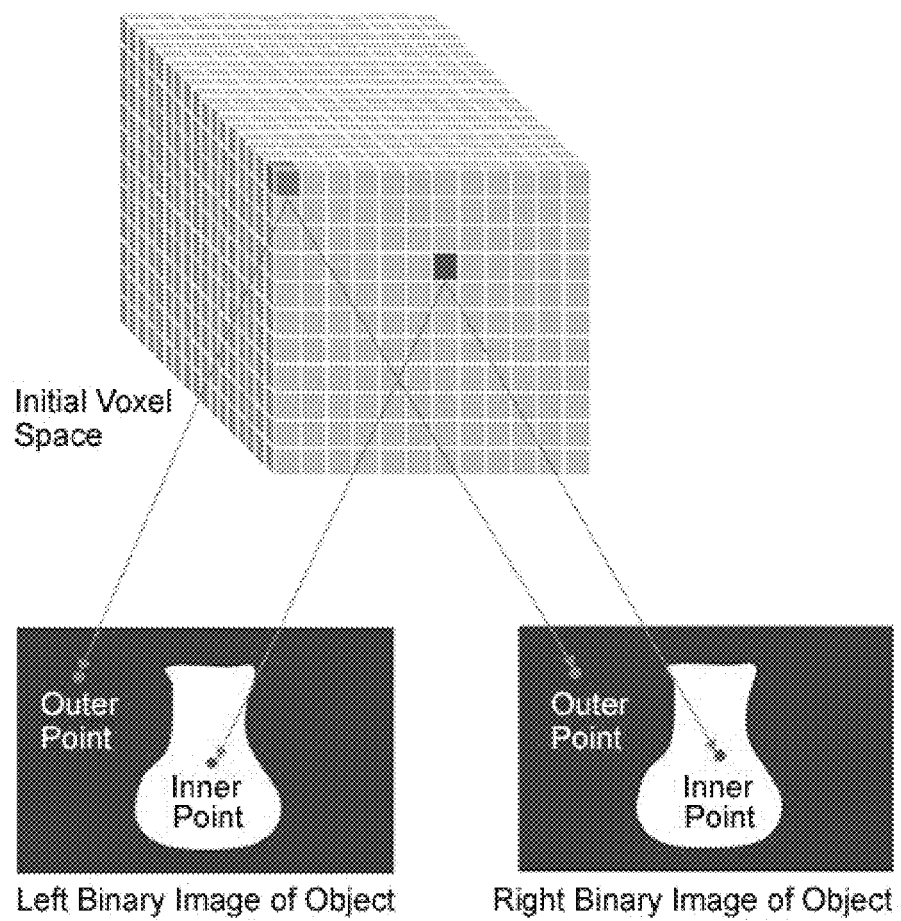
FIG. 15 is a schematic view illustrating division of a voxel space using binary images of an object.

The procedure for dividing voxels corresponding to the ground and complete view from the initial voxel space, using the binary image, is carried out as shown in FIG. 15.

When one voxel is projected in an object image space, the three-dimensional coordinates of the voxel may be represented by "(x, y, z)". Let's assume the coordinates as center coordinates of the voxel. The projection of a point in a three-dimensional space into an object image space is determined based on a calibration value of a stereo x-ray system, and may be calculated using the following expressions:

$$u_k = \frac{x - T_{xk} - (z - T_{zk})\tan\theta_k}{S_k}$$

$$v_k = f_k \cos\theta_k \frac{y - T_{yk}}{z - T_{zk}} + p_{vk}$$

Figure 16:
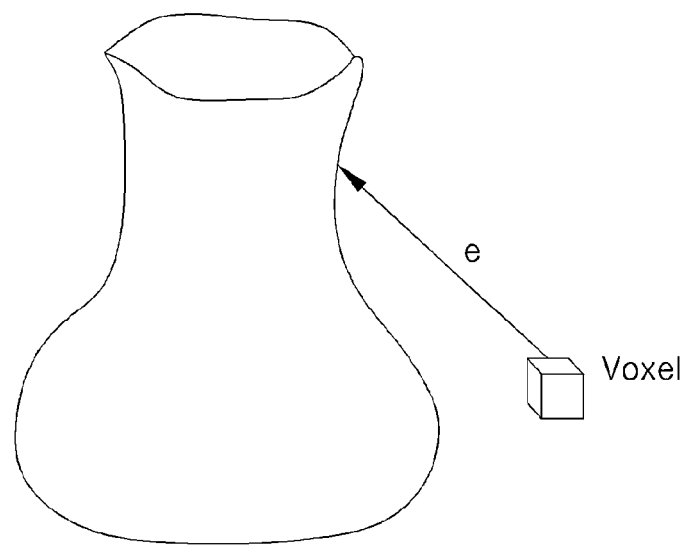
FIG. 16 is a schematic view illustrating a vector from a voxel to a three-dimensional outline.

When the red voxel in FIG. 16 is projected in the form of an image, it can be seen that the voxel is not projected as an inner region of the object, but projected as an outer region of the object. That is, it can be seen that the red voxel does not belong to the object, but belongs to the ground. Accordingly, such a voxel is removed from the initial voxel space.

Meanwhile, when the green voxel is projected in the object image space, it can be seen that the green voxel corresponds to an inner point of the object.

When the ground voxels are removed, only the voxels determined as the inner points of the object are left. However, all of these voxels are not the inner points of the object. This feature is exhibited when three-dimensional points are projected in the form of two-dimensional image points.

For example, although voxels disposed in front or rear of the object are determined as inner points of the object when they are projected in the form of a two-dimensional image, in spite of the fact that the voxels are actually disposed outside the object, so that they are left without being removed. In order to remove such voxels, a previously-reconstructed three-dimensional outline is used in the illustrated embodiment of the present invention.

First, a three-dimensional vector e from one voxel to a three-dimensional outline is taken into consideration, as shown in FIG. 16. Since the three-dimensional outline is a set of three-dimensional points, the vector e may be defined for all points of the outline. Let's assume that the current voxel is an inner voxel of the object to be reconstructed. Then, the vector e associated with the current voxel is defined for all outline points, and the definition results are accumulated. That is, when it is assumed that the three-dimensional outline is constituted by K points $p_k$, and "v" represents the current voxel, the vector from the current voxel to one point of the outline, $e_k$, may be expressed as follows:

$e_k = p_k - v$

The vectors associated with all outline points are normalized, and then accumulated to derive an accumulated vector E, as expressed in the following expressions:

$$\tilde{e}_{ik} = \frac{e_k}{\|e_k\|}$$

$$E = \sum_k \tilde{e}_k$$

Figure 17:
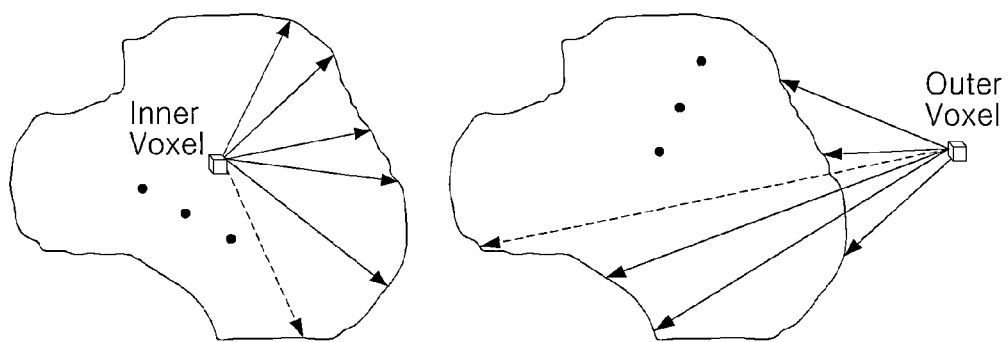
FIG. 17 is a view illustrating accumulation of three-dimensional outline vectors of inner and outer voxels.

A method for determining whether a voxel is an inner point or an outer point, using the accumulated vector E, is illustrated in FIG. 17.

Referring to FIG. 17, it can be seen that, when the vector $e_k$, which is associated with an inner voxel, is accumulated while being rotated 360°, the resultant accumulated vector is theoretically zero, irrespective of the position of the voxel. That is, when all vectors in 360° are accumulated, the resultant accumulated vector has a very small value because each of the vectors has directionality. Hereinafter, an accumulated vector associated with an outer voxel shown in a right portion of FIG. 17 will be reviewed. Since the vectors $e_k$, which are associated with the outer voxel, have directionality biased to one side, the accumulated vector obtained after normalizing and accumulating the vectors $e_k$, does not converge to zero. Using such characteristics of the accumulated vectors, it is determined whether the current voxel is an inner voxel or an outer voxel, in order to remove outer voxels.

A volume reconstruction test is conducted using the three-dimensional image forming method.

In the volume reconstruction test, stereo x-ray images acquired by the stereo x-ray inspection apparatus are transformed into binary images through image processing, respectively. From the binary images, a three-dimensional outline is acquired, and the volume of an object to be inspected is reconstructed.

For the object to be inspected, a gas torch is used. The gas torch is made of a metal material, and includes a handle having a relatively narrow structure, a gas nozzle, and a gas connecting portion.

Figure 18:
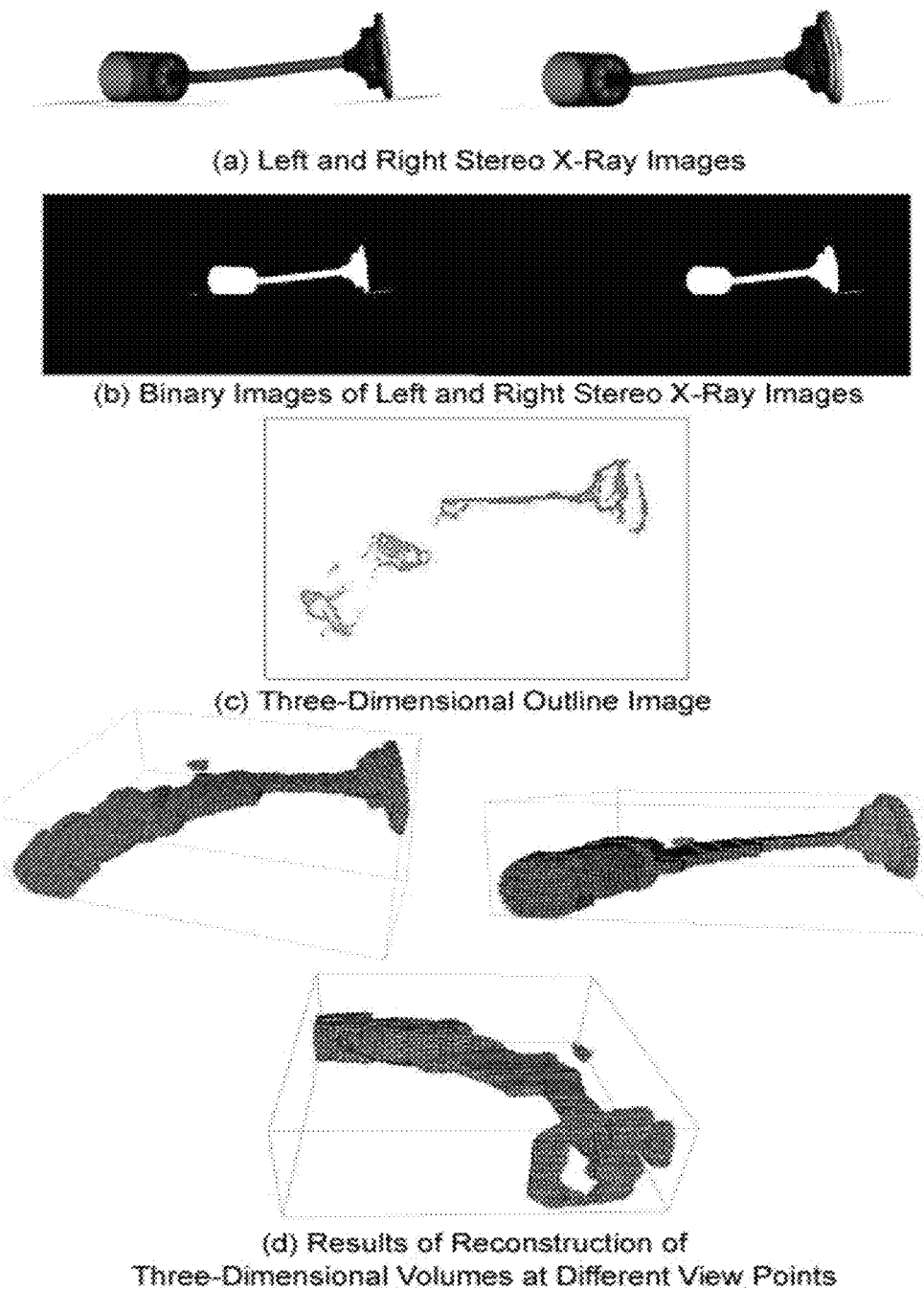
FIG. 18 is a view illustrating a three-dimensional volume reconstruction procedure for a gas torch.

The test procedure is illustrated in FIG. 18. Binary images and a three-dimensional outline are acquired. A three-dimensional volume is represented by voxels. Referring to FIG. 18, it can be seen that the three-dimensional shape of the object is realistically reconstructed. It can also be seen that, even when the view point for the reconstructed volume is changed, there is no problem in recognizing the object.

For another object to be inspected, a model car is used in the test. This test procedure is illustrated in FIG. 19.

Figure 19:
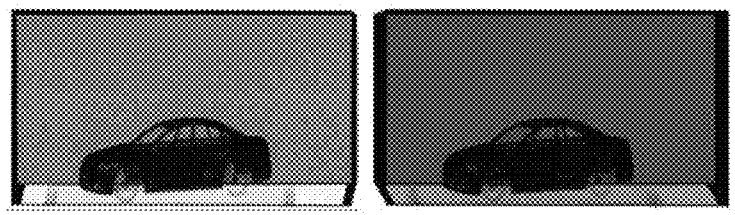
FIG. 19 is a view illustrating a three-dimensional volume reconstruction procedure for a model car.
Figure 19:
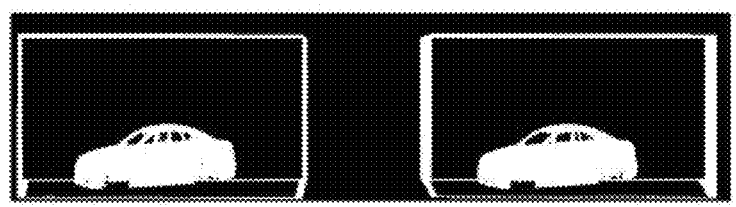
Figure 19:
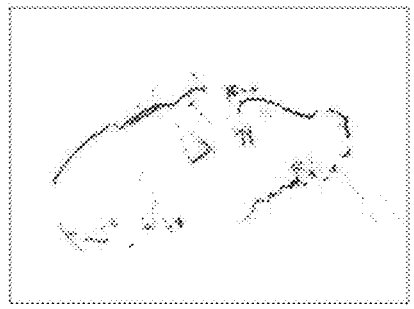
Figure 19:
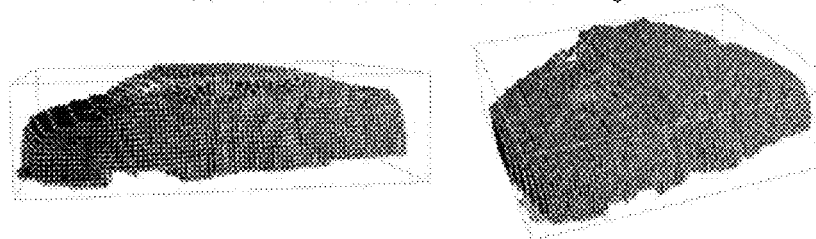
Figure 19:
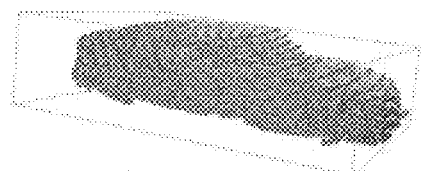

As shown in FIG. 19, test results associated with stereo x-ray images for a model car having a relatively small size can be obtained. Referring to FIG. 19, it can be seen that, although it is difficult to recognize the shape of the model car, using an acquired three-dimensional outline, and there is noise in the three-dimensional outline, it is possible to easily recognize the shape of the object, using a reconstructed three-dimensional volume of the model car.

As apparent from the above description, the stereo x-ray inspection apparatus and the three-dimensional image formation method for an image acquired from the apparatus have various effects. That is, it may be possible to acquire a more accurate image of an object to be inspected by combining two images acquired through irradiation of an x-ray to the object at different angles, thereby acquiring a stereo image, and thus to achieve easier inspection. In particular, in the configuration to acquire two images, only one x-ray generator, which is expensive, and two detectors are used, in order to reduce the costs of the apparatus and to achieve easy control operation. Also, the x-ray generator and the first and second detectors are always arranged in the form of a right-angled triangle, so that it is possible to achieve easy mathematical development and analysis of the acquired images, and thus to more rapidly provide an accurate image.

In addition, it is possible to more accurately inspect an object by reconstructing a three-dimensional image of the object through matching of pixels corresponding to an edge of an object image exhibiting a remarkable variation in brightness, and reconstructing a volume image of the object, based on the edge image.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A stereo x-ray inspection apparatus comprising:
   a feeding unit for feeding an object to be inspected;
   an x-ray generator installed at one side of the feeding unit to irradiate x-rays to the object;
   first and second detectors for detecting x-rays passing through the object after being irradiated from the x-ray generator to the object;
   a horizontal feeding unit for horizontally moving the second detector; and
   a rotating unit for rotating the x-ray generator,
   wherein the x-ray generator and the first detector are disposed to be opposite to each other along a perpendicular line extending between the x-ray generator and the first detector, and the second detector is disposed on a horizontal line perpendicular to the perpendicular line, along with the first detector, so that the x-ray generator, the first detector and the second detector are arranged to form a right-angled triangular shape.

2. The stereo x-ray inspection apparatus according to claim 1, further comprising:
   a rotating unit for rotating the second detector in accordance with a position to which the second detector is moved by the horizontal feeding unit, to cause the second detector to always be directed to the x-ray generator.

* * * * *